United States Patent [19]

Parshall

[11] 4,250,036
[45] Feb. 10, 1981

[54] CONVEYING MEANS FOR USE IN FILTERING DEVICES

[75] Inventor: David G. Parshall, Northville, Mich.

[73] Assignee: AMSTED Industries Incorporated, Chicago, Ill.

[21] Appl. No.: 65,059

[22] Filed: Aug. 9, 1979

[51] Int. Cl.³ .................. B01D 35/16; B01D 33/36
[52] U.S. Cl. .................................. 210/297; 210/298; 210/406; 210/414
[58] Field of Search ............... 209/389, 390; 210/413, 210/299, 526, 298, 406, 297, 411, 414

[56] References Cited

U.S. PATENT DOCUMENTS

| | | | |
|---|---|---|---|
| 1,799,457 | 4/1931 | Cuttle et al. | 210/413 X |
| 2,067,277 | 1/1937 | Miick | 210/526 X |
| 2,102,570 | 12/1937 | Lind | 210/298 |
| 2,765,922 | 10/1956 | Hock | 210/413 X |
| 3,675,778 | 7/1972 | Hoag | 210/298 X |
| 3,748,835 | 7/1973 | Panzica | 210/413 X |

Primary Examiner—Frank A. Spear, Jr.
Attorney, Agent, or Firm—John L. Schmitt; Fred P. Kostka; Edward J. Brosius

[57] ABSTRACT

Filtering devices wherein solid particulate matter is separated by filter media from a liquid flow often contain conveying means for moving the separated solid particulate to an external point for disposition. One such conveying means usable in filtering devices includes spaced endless chain loops wherein each chain comprises alternate center links pivotally joined by pins to alternate sets of spaced side bars. In each center link is an elongated aperture which in a controlled manner holds an extension bar attached to each end of a traversely positioned flight. The spaced chain may be operatively connected to a source of rotary power to periodically advance the conveying means so that the flights may be moved over a section of the filter media to effectively remove separated particulate matter collected thereon.

3 Claims, 5 Drawing Figures

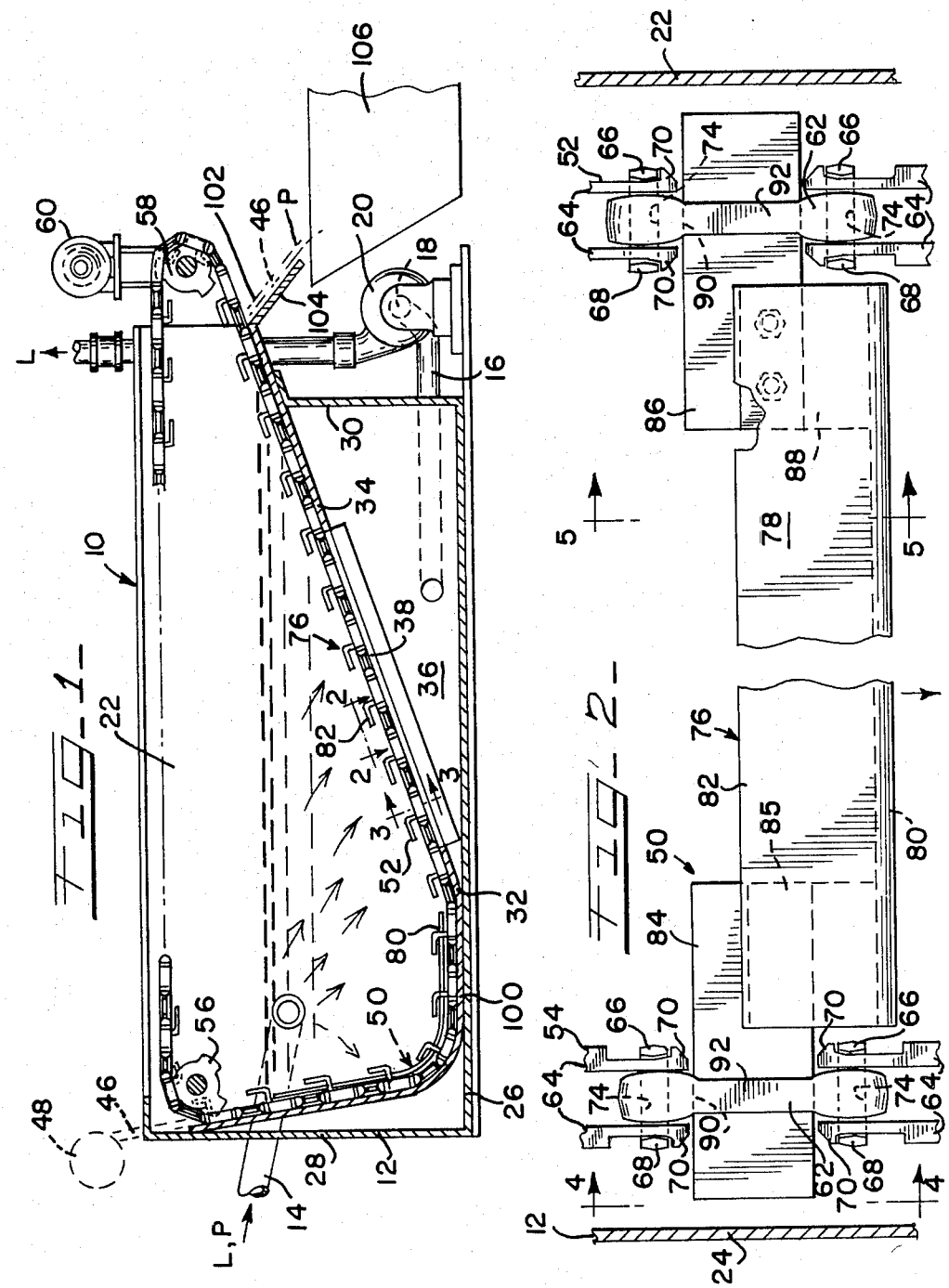

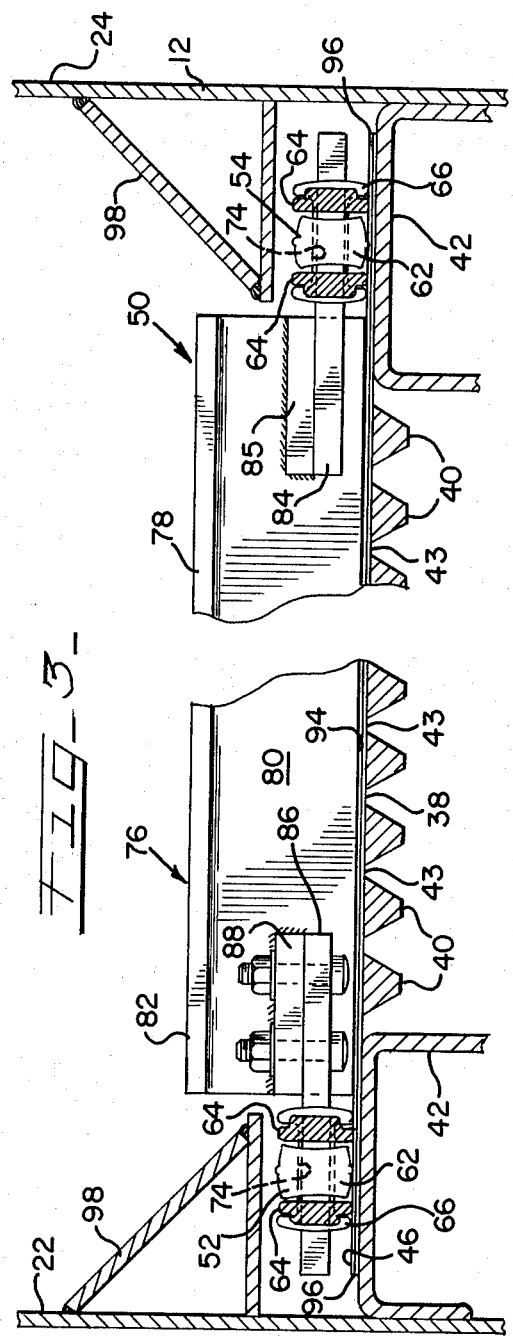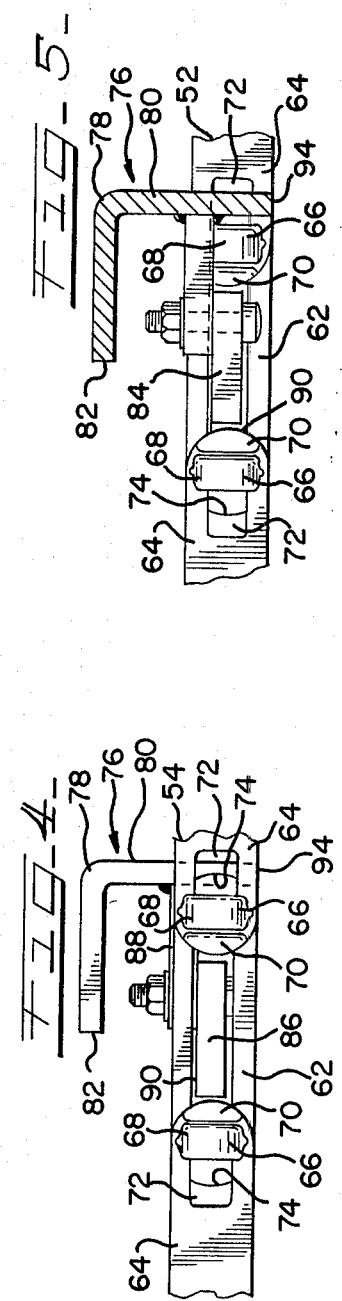

CONVEYING MEANS FOR USE IN FILTERING DEVICES

BACKGROUND OF THE INVENTION

1. Field of the Invention

This invention relates to filtering devices usable to separate solid particulate from liquids and more particularly to filtering devices including conveying means for removing separated particulate matter and transferring such to an external point for disposition.

2. Description of the Prior Art

The use of a conveying means to remove and transport separated particulate matter in solid-liquid separators is well known and is disclosed, for example, in U. S. Pat. Nos. 3,087,620; 3,091,336; 3,221,885 and 3,225,928. Conveying means utilized in the filtering devices disclosed in the above-noted patents is shown in some detail in co-pending U.S. application Ser. No. 957,708.

In all of the above-identified conveying means, a pair of spaced chains are used to move a series of transversely positioned flights held therebetween over a collecting surface wherein the flights drag the separated particulate from the filter device.

SUMMARY OF THE INVENTION

A filter device may include an elongated tank to receive a flow of liquid carrying solid particulate matter from an appropriate inlet. In a bottom of the tank is a separating means such as a wedge wire section which connects with an upwardly inclined portion extending above and beyond the tank. The separating means entraps the particulate matter while allowing the liquid to pass and flow to an outlet. When the particulate matter has a particularly small particle size, the wedge wire section may be covered by a disposable filter cloth supplied, for example from an externally located roll. In this case, the filter cloth entraps the particulate matter while the wedge wire merely provides a supportive but flow-through surface below.

Such a filter device may include a conveying means comprising a pair of spaced endless chain loops rotatively carried by pairs of spaced sprockets located at each end of the tank. One such sprocket pair is connected to a source of rotary power so that the conveyor may be selectively activated.

The chains are made of a series of spaced center links having ends pivotally connected to pairs of adjacent side bars by a readily removable pivot pin. In a center section of each link is an elongated slot.

The center links of each chain are aligned and carry an extension bar attached to ends of a flight positioned transversely between the spaced chains. One such extension bar will normally be bolted to a bracket affixed to the flight to allow ready replacement of the flight due to damage or wear.

A portion of the conveyor is positioned within the tank and engages with the wedge wire or filter cloth as the case may be and the upwardly inclined portion. When a sufficient amount of particulate matter has been collected, the conveyor advances to remove some of the collected particulate matter on the separating means and drag the separated matter up the inclined portion for external disposition.

The filter device and conveying means used therewith have several important advantages over known combinations.

First, by providing a controlled fit between the flight assemblies and the pair of spaced chains, each chain may form a natural seat with a support surface on which the chains rest. Where filter cloth is used, outer edges of the filter cloth are held against such a support surface by the chains to promote a seal therebetween. The seal inhibits any by-passing of liquid about the edge of the filter cloth as the filter cloth rests on the wedge wire section and on the inclined portion.

Next, the connection between the center links and side plates of the chain is sufficiently loose to allow a build up of grit, dirt and even some corrosion without imparting a stiffening effect. Thus, the chains remain flexible and continue to form a natural seat with surfaces on which they rest.

Further, the controlled fit between the chains and the flight assemblies and the configuration of the flight assemblies allows a bottom edge of each flight to form a natural seat with, for example, the wedge wires as well as the tank inclined portion. This natural seat is further enhanced in that the flight remains substantially perpendicular to a surface below. When the conveyor is advanced, this natural seat provides improved scraping of the wedge wires and thus improved removal of collected particulate. Additionally, this natural fit inhibits an inadvertent release of the removed matter as it is dragged up the inclined tank portion.

Lastly, because of its simplified design, a filtering device with a conveyor may be more economically produced and used. Considering the noxious nature of some particulate matters, reduction of manual input to accomplish removal is particularly desirable.

DESCRIPTION OF THE DRAWINGS

FIG. 1 is a cross-sectional elevational view of a filter device of this invention.

FIG. 2 is a cross-sectional view as generally seen along the line 2—2 of FIG. 1.

FIG. 3 is a cross-sectional view as generally seen along the line 3—3 of FIG. 1.

FIG. 4 is an end elevational view as generally seen along the line 4—4 of FIG. 2.

FIG. 5 is a cross-sectional view as generally seen along the line 5—5 of FIG. 2.

DESCRIPTION OF THE PREFERRED EMBODIMENT

A filtering device of this invention is shown generally in FIG. 1 and designated 10. The device 10 includes an elongated tank 12 to which is connected a liquid-particulate inlet pipe 14 and a discharge pipe 16. The discharge pipe 16 may be connected to an intake 18 of a pump 20 where a flow of liquid between the inlet 14 and the discharge 16 is to be maximized or where a force other than gravity is required to move the liquid being discharged.

The tank 12 further includes spaced sidewalls 22, 24, a bottom 26, a front wall 28 and a rear wall 30. Joining the bottom 26 at a point 32 is an inclined upper partition 34 of a vacuum box 36. The vacuum box 36 is in part defined by the bottom 26 and the rear wall 30 of the tank 12. The upper partition 34 of the vacuum box 36 includes a pass-through section 38 which may be formed of spaced wedge wires 40 located between a pair of spaced channel members 42. The channel members 42 are attached one each to the tank sidewalls 22, 24.

A width of spaces 43 between the wedge wires 40 in the pass-through section 38 is determined by the size of the particulate in the liquid flow and whether the wedge wires 40 are to provide the primary means for separating the particulate from the liquid. Where the particulate comprises small particles the wedge wires 40 alone cannot be used effectively. In such a case, a piece of disposable filter cloth 46, for example, covers the pass-through section 38 to effect particulate separation and the wedge wires 40 provide a support therebelow. As shown by phantom lines in FIG. 1, the filter cloth 46 may be supplied from a roll 48 carried external to the tank 12.

Conveying means 50 usable with the filter device 10 includes a pair of spaced endless chain loops 52, 54 carried by a pair of idle sprockets 56 and a pair of drive sprockets 58. The drive sprockets 58 are operatively connected to a motor 60. It should be understood that the configuration of the endless chain 52, 54 is not limited to a simple loop but may be formed into configurations comparable to other conventional drive chains.

Each chain 52, 54 is formed by alternately joining a center link 62 to pairs of side bars 64 by pins 66. The center links 62 and the side bars 64 may be readily assembled in that the pin 64 has a rectangular-shaped head 68 which abuts a shoulder 70 formed on an outer end of each side bar 64. The pin head 68 interacts with the shoulder 70 to prevent pin rotation when so joined.

To disassemble the center link 62 from the side bars 64, the center link 62 and the side bars 64 may be pressed together allowing the pin 66 to be rotated 90 degrees and removed through a slot 72 formed in each end of the side bar 64 and an aperture 74 formed in ends of each center link 62.

When the chain loops 52, 54 are assembled about the pairs of sprockets 56, 58, the chains 52, 54 are placed in sufficient tension to maintain the orientation of the pins 66 as seen in FIGS. 4 and 5. However, there remains sufficient slack in each chain 52, 54 to allow a disassembly of a particular center link-pin-side bar joint as detailed above.

The conveying means 50 further includes a flight bar assembly 76 comprising and angle-shaped flight 78 so positioned to have a vertical leg 80 and an upper horizontal leg 82. At one end of the flight 78 is a fixed extension bar 84 attached to the vertical leg 80 of the flight 78 by means of a bracket 85. Attached to an opposite end of the flight 78 is a removable extension bar 86 threadedly secured to a bracket 88 affixed to the flight vertical leg 80.

Each extension bar 84, 86 is positioned to a rear of the flight 78 and extends outwardly through an elongated opening 90 formed in a center portion 92 of each center link 62 of the chains 52, 54. Each extension bar 84, 86 fits in a controlled manner within the opening 90. The brackets 85, 88 and the extension bars 84, 86 position the vertical leg 80 of the flight 78 ahead of the attached center link 62. The controlled fit between the flight assembly 76 and the chains 52, 54 maintains the correct orientation of the leg 80 of the flight 78. This correct orientation is also insured by properly locating the center of gravity of the flight assembly 76 such that a bottom edge 94 of the vertical leg 80 remains substantially perpendicular to a horizontal and inclined support surface therebelow.

Where the particulate in the liquid flow is of such a nature as to collect in an area other than the pass-through section 38, for example if the particulate were metal chips from a machining operation, wedge-shaped deflectors 98 are attached to the sidewalls 22, 24 of the tank 12. The deflector 98 directs such particulate within spaces formed between the flight assemblies 76. Additionally, the deflectors 98 help prevent an accumulation of the particulate which could inhibit the natural seat formed by the flights 78 and the chains 52, 54 discussed earlier.

During operation of the filtering device 10, a flow of a liquid L containing particulate matter P enters the tank 12 through the inlet pipe 14. Because of a pressure differential across the pass-through section 38, created by gravity or by the pump 20, the liquid L and particulate matter P flow toward the pass-through section 38 as denoted by the arrows in FIG. 1. Where the particulate comprises some sufficiently large and heavy particles, separation may be effected immediately by gravity with such particles settling onto a collector guide plate 100. Lighter and smaller particulate particles flow with the liquid L to the pass-through section 38 and are separated from the liquid L by the piece of filter cloth 46 or the wedge wires 40 depending upon the type of filter means used in the device 10.

The separated particulate matter P forms into a cake which gradually thickens so as to increasingly restrict the flow of the liquid L into the vacuum box 36. Where the filter cloth 46 is used as the primary separation means in the filter device 10, the chain loops 52, 54 interface with outer edges 96 of the filter cloth 46 to seal these edges 96 against the collection guide plate 100, the channel members 42 and the upper inclined partition 34. This seal inhibits any flow of the liquid L around the edges 96 which could allow the liquid L to enter the vacuum box 36 in an unfiltered condition.

When the flow of the liquid L is sufficiently reduced by the thickened cake of particulate, the motor 60 is energized to advance the conveying means 50 in a counterclockwise direction as seen in FIG. 1. Where the filter cloth 46 is used, the flight assemblies 76 and the pair of chains 52, 54 drag the piece of filter cloth 46 forward. This advancement may be in short intervals so that a clean portion of the filter cloth 46 covers only a small portion of the pass-through section 38. During this advancement, the chains 52, 54 maintain the seal between the edges of the filter cloth 46 as described earlier.

Where the wedge wires 40 are used as the primary filtering means, a short interval advancement of the conveying means 50 results in the bottom edge 94 of each flight 78 scraping the cake of particulate from the wedge wires 40 to provide a cleaned area. Because of the natural fit or seat formed between the bottom edge 94 of each flight 78 and the wedge wires 40, particulate removal is substantially improved. Note also that this removal takes place over the collection guide plate 100 if a portion of the particulate P has collected thereon. Because the flight assembly 76 remains substantially perpendicular to the inclined partition 38 so that the bottom edge 94 of the flight 78 forms a natural fit therewith, the removed particulate matter is inhibited from sliding backward under the influence of gravity.

With each advancement of the conveying means 50, the separated particulate P is moved toward a discharge point designated 102 where the inclined upper partition 34 of the vacuum box 36 terminates and is joined by a downwardly inclined guide plate 104. The particulate matter P under the influence of gravity and momentum supplied by the conveyor means 50 is directed into a convenient container 106.

While various modifications may be suggested by those versed in the art, it should be understood that I wish to embody within the scope of the patent warranted hereon all such modifications as reasonably and properly come within the scope of my contribution to the art.

What is claimed is:

1. In a filter device particularly adapted for separating particulate matter from a liquid flow, the improvement therein comprising, a tank to receive said flow of said liquid and said particulate matter from an inlet connected thereto, said tank having a bottom including a gravity settling area located adjacent to said inlet, a pass-through section located downstream from said gravity settling area, and an inclined partition connecting said pass-through section to a particulate disposition point in said tank, a vacuum box comprising a liquid-tight enclosure carried by said tank below said pass-through section to receive said liquid therein, separating means carried by said filter device and interfacing between said tank and said vacuum box and forming part of said pass-through section, said means allowing said liquid to flow into said vacuum box and inhibiting said flow of said particulate matter causing said particulate matter to collect on said means, and conveying means for moving said particulate matter collected in said settling area and on said separating means and transferring said particulate matter over said inclined partition to said disposition point, said conveying means further comprising, a pair of spaced driving elements each formable into an endless loop so as to be operatively carriable by sprocket means connectable to said filter device, said elements in part disposable in said tank to engage with said settling area, said pass-through section, and said inclined partition, said driving elements being a pair of chains having a plurality of elongated center links alternatively spaced between pairs of side bars with ends of adjacent links and side bars pivotally joined by a readily removable pin, a plurality of spaced flight assemblies each having an elongated body transversely positioned between said driving elements with ends of said assemblies loosely engaged with said driving elements, said driving elements and said flight assemblies each forming a natural, close fitting seat with said settling area, said pass-through section, and said inclined partition therebelow, each said flight assembly including an angle-shaped flight having a bottom edge located at a lower end of a vertical leg of said flight, and an extension bar attached in an offset manner to a rear of said flight at ends of said flight, said bars projecting outwardly to engage with an elongated opening provided in said chain center link to form a loose fit with said center link, each said flight assembly having a center of gravity to maintain said vertical leg in a substantially perpendicular location with respect to said settling area, said pass-through section, and said inclined partition, and drive means operatively connected to said driving elements to selectively advance said elements and said attached flight assemblies while said elements and said flight assemblies maintain said natural seat with said settling area, said pass-through section, and said inclined partition.

2. In a filtering device particularly adapted for separating particulate matter from a liquid flowing from an inlet to an outlet in a tank, said filtering device including a conveying means for transporting said separated particulate matter from said tank to an external disposition point, the improvement of said conveying means comprising, a pair of spaced chains formed in part by pivotally joining a series of center links having an elongated opening formed in a center portion thereof, and a series of flight assemblies positioned transversely between said chains and having ends carried loosely within said chain center link openings, said flight assemblies having a center of gravity to produce a substantially torque-free fit between said chain and said flight assembly when said conveying means is moved in a horizontal and upwardly inclined direction, wherein said chains and said flights may each form a continuous, natural, gravity-induced fit with supporting surfaces therebelow.

3. In a filtering device particularly adapted for separating particulate matter from a liquid flow, said device including a tank having an inlet at a first end of said tank to allow an inflow of said particulate matter and said liquid and an outlet proximate to a second end of said end of said tank to allow a discharge of said liquid free of said particulate matter, the improvement therein comprising, a pass-through section carried in a lower portion of said tank and including a pair of channel members affixed one each to sidewalls of said tank, a wedge wire section supported between said channel members to provide a series of openings to allow a passage of said liquid, said pass-through section connecting said tank inlet to said tank outlet, filter cloth suppliable from a roll located external of said tank, said cloth extending from said roll, into said tank, over said pass-through section and an inclined partition connecting said pass-through section to a particulate discharge point external of said tank, said cloth having edges extending beyond said wedge wire section to engage said channel members, said cloth forming a separating means to inhibit passage of said particulate matter as said liquid flows therethrough to said outlet with said particulate matter collecting on said cloth above said wedge wire section, conveying means comprising two spaced endless chains rotatively carried by sprockets connectable to said tank, each said chain including a series of elongated center links joined to pairs of spaced side bars by a removable pin to allow each said chain to be readily assembled or disassembled, said center links containing an elongated opening in a center portion thereof, a portion of each said chain engaging with said filter cloth edges respectively to form a sealing fit between said filter cloth, said pass-through section channel members and said inclined partition, and a series of spaced flight assemblies transversely positioned between said chains, said assembly comprising an angle-shaped flight having a downwardly extending leg joined to an upper rearwardly extending leg, a pair of brackets affixed one each to said downward leg under said rearward leg at ends of said flight and a pair of extension bars connected one each to said brackets, each said bar projecting outwardly from said flight end to fit through said elongated opening in said chain center link with a loose fit, a center of gravity of said flight positioning a bottom edge of said downward leg to maintain a square, gravity-induced, natural fit with said filter cloth positioned on said pass-through section and said inclined partition, said fit insuring said filter cloth is advanceable in a wrinkle-free condition upon activation of said conveying means, said fit inhibiting a leakage of said collected particulate matter on said filter cloth positioned on said inclined partition, wherein said filter cloth may be periodically advanced from said roll to said particulate discharge point by movement of said flight assemblies by said chain, said movement providing a selective clear area of said filter cloth over said pass-through section for further collection of said particulate matter and a discharge of said filter cloth and said collected particulate matter at said discharge point.

* * * * *